Figures 1, 5:
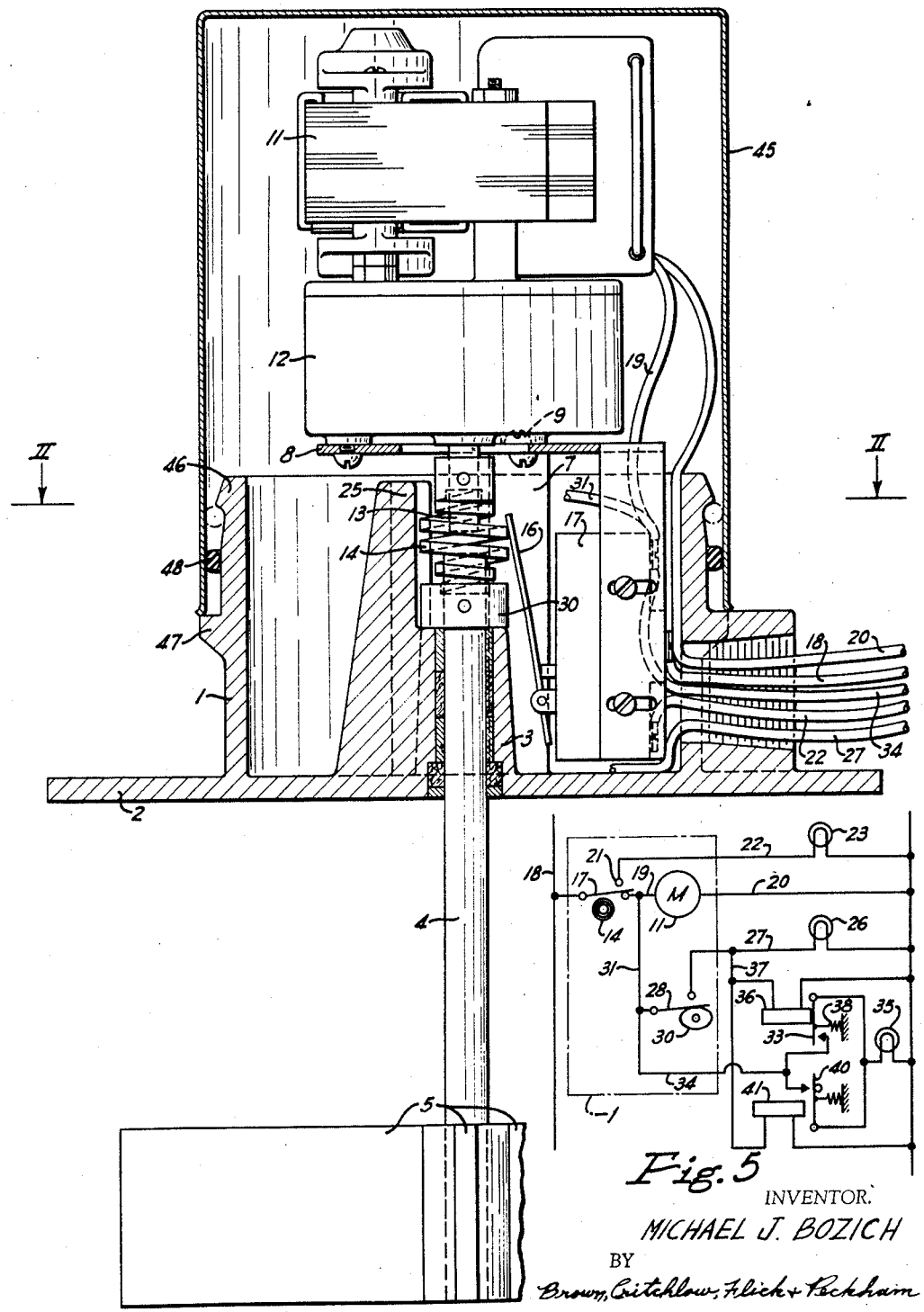

Oct. 20, 1959   M. J. BOZICH   2,909,766
BIN LEVEL INDICATOR
Filed July 8, 1958   2 Sheets-Sheet 1

INVENTOR.
MICHAEL J. BOZICH
BY
Brown, Critchlow, Flick + Peckham
His Attorneys

Oct. 20, 1959 M. J. BOZICH 2,909,766
BIN LEVEL INDICATOR
Filed July 8, 1958 2 Sheets-Sheet 2
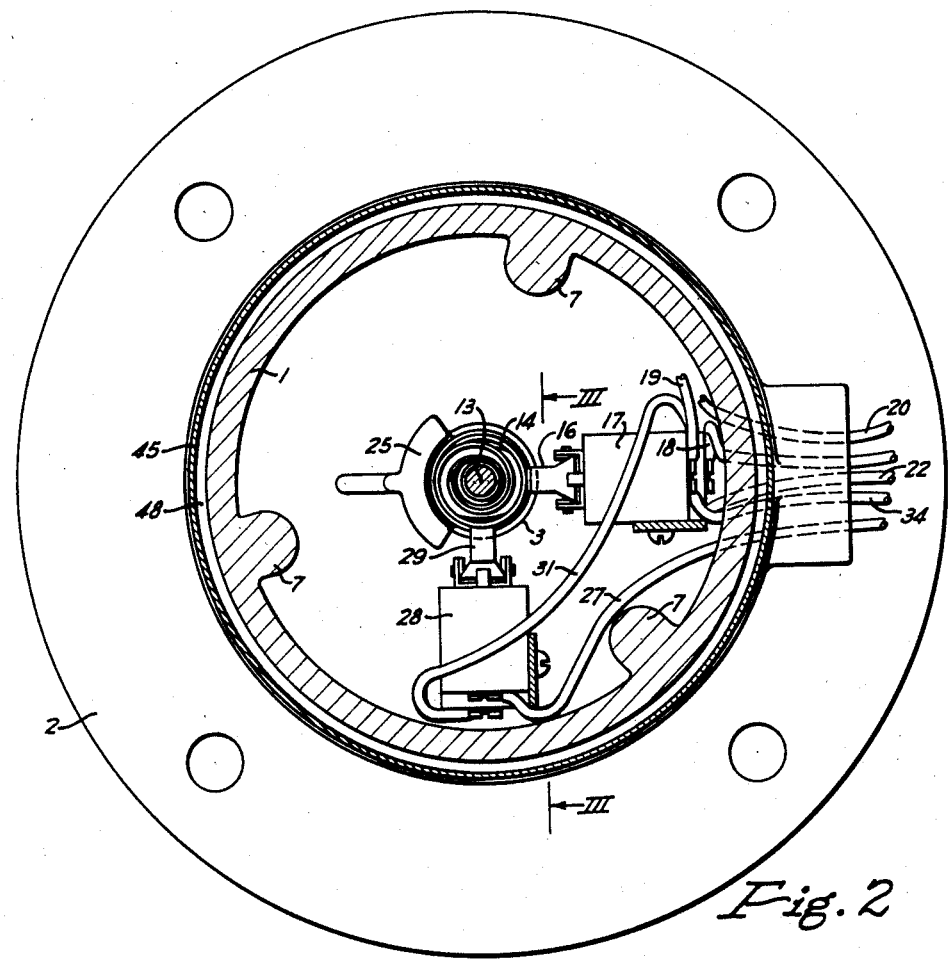
Fig. 2
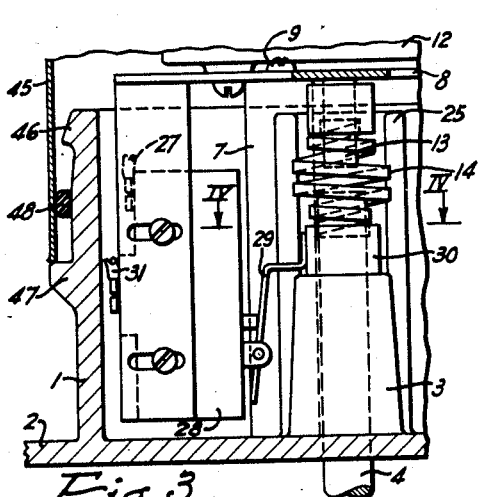
Fig. 3
Fig. 4
INVENTOR.
MICHAEL J. BOZICH
BY
Brown, Critchlow, Flick & Peckham
His Attorneys

2,909,766
BIN LEVEL INDICATOR
Michael J. Bozich, Pittsburgh, Pa.

Application July 8, 1958, Serial No. 747,280

8 Claims. (Cl. 340—246)

This invention relates to bin level indicators of the type shown in my Patent 2,698,362.

It is among the objects of this invention to provide such an indicator, which shows that it is operating, which can control external electric circuits, which does not allow undue distortion of the drive spring, and which is sealed by a cover that is easily removed and attached.

The preferred embodiment of the invention is illustrated in the accompanying drawings; in which Fig. 1 is a vertical section;
Fig. 2 is a horizontal section taken on the line II—II of Fig. 1;
Fig. 3 is a fragmentary vertical section taken on the line III—III of Fig. 2;
Fig. 4 is a fragmentary horizontal section taken on the line IV—IV of Fig. 3; and
Fig. 5 is a wiring diagram.

Referring to Figs. 1, 2 and 3 of the drawings, a cup-like housing 1 is closed at one end and open at its opposite end. The closed end, which I shall refer to as the base, is encircled by a mounting flange 2 so that the housing can be secured to a bin or the like around an opening therein. The base of the housing has a central opening through it, from which a hub 3 extends upward. Journaled in this hub is a shaft 4, the lower end of which carries a paddle provided with a number of radially extending vanes 5.

The side wall of the housing is provided inside with some vertical ribs 7 that extend above the wall and support a spider 8 fastened to them by means of screws 9. The spider supports an electric driving unit, which includes an electric motor 11 mounted on top of a gear box 12 containing a double worm gear reduction. The motor drives through this gear box a short driven shaft 13 that is axially aligned with paddle shaft 4 but is spaced a short distance from it. The two shafts are operatively connected together by an elongated helical torsion spring 14, the opposite ends of which are connected to the adjacent ends of the shafts.

As long as the paddle is free to rotate, the driving unit will turn it by means of the coil spring, which serves as a coupling. If the rotation of the paddle is stopped by material in a bin rising to the level of the paddle, the diameter of the spring will start to change as the motor continues to operate. The direction of rotation generally is chosen so that at such times the diameter of the spring coil will become larger. As its diameter increases, one of the larger convolutions of the spring will engage the pivoted controller 16 of an electric switch 17 suspended from spider 8. This switch, to which electric current is supplied through a wire 18, contains normally closed contacts that are electrically connected with one terminal of the driving motor by a wire 19. Current is delivered to the other terminal of the motor through a wire 20. When the switch controller is moved by the expanding coil spring, the switch is opened to shut off the motor. It is preferred that a double throw switch be used, in which there also is a normally open contact 21 (Fig. 5). The circuit through this contact is closed by the controller at the same time that the other contacts are opened. Contact 21 is in a signal circuit 22 which, when energized, shows that the motor has stopped. Usually, an electric light 23 is a sufficient signal for for this purpose.

To minimize the amount that the coil spring 14 will have to enlarge in order to actuate the switch, and thereby reduce distortion of the spring, a guide member 25 is disposed beside the spring. This member is spaced a slight distance from the spring while the spring is driving the paddle shaft. The guide member may be integral with the hub and it has an inner surface substantially concentric with the two shafts, so that when a large convolution of the spring starts to enlarge it will more or less fit the inner surface of the guide member and be held against further movement in that direction and also be prevented from slipping sideways on that member. Since the guide member restrains movement of the expanding convolution in that direction, expansion must also occur mainly in the opposite direction and will quickly actuate the switch controller and shut off the motor, whereupon lamp 23 will light, unless a bell or some other type of suitable electric signal is used.

Another feature of this invention is that this device constantly indicates that the paddle is turning as long as that is the case. Therefore, an attendant can tell at a glance whether or not this bin level indicator is functioning properly, because it would be possible for the motor to continue to operate without moving the paddle, such as if the driving spring 14 happens to break. In that case the lamp 23 would not light. The device that indicates that the paddle is turning may be an electric light 26 (Fig. 5), for example. This signal is connected in an electric circuit 27 controlled by a switch 28 suspended in the housing from spider 8 and having a pivoted controller 29 extending beside the hub 3. As shown in Figs. 3 and 4, the free end of this controller is in a position to be moved periodically by a cam 30 rigidly mounted on the paddle shaft directly above the hub. The cam may have one or more high areas for actuating the controller one or more times per revolution of the shaft. Every time the switch controller is moved by the cam, the switch is closed and the signal light 26 in that circuit flashes. The switch is connected by wire 31 with the motor side of motor switch 17, so that when the motor switch is open the circuit to lamp 26 likewise will be open. This prevents the signal light from being left on in case a high part of the cam is in engagement with the signal switch controller when the motor stops.

The signal switch 28 can also be used to control auxiliary circuits, such as those controlling the feed of material to the bin, or processing equipment connected with the bin. For this purpose, as shown in Fig. 5, a switch 33 may be connected in a circuit parallel with the signal circuit and including a wire 34 connected with the same side of switch 17 as wire 31. When the auxiliary switch is closed, a circuit will be energized that will stop or start a desired device or apparatus. For example and for the purpose of illustration only, it may light an electric lamp 35 that will show that the entire unit is not functioning even though the motor switch is closed. During normal operation of the bin level indicator, switch 33 is held open by a timer mechanism or element 36 of well-known form, which is connected by a wire 37 with wire 27 in the signal circuit. The timer is one that must be energized at frequent predetermined intervals in order to maintain the switch open, and that is done by the signal switch 28 as it is closed periodically by the rotating cam 30. Therefore, if the cam stops without closing the signal switch, the timer will allow a spring 38 to close the auxiliary switch.

Since it is possible for the cam to stop in a position where the signal switch 28 will be closed, the timer 36 then would continue to be energized and would not permit the auxiliary switch 33 to close. To take care of such a situation, another auxiliary switch 40 is provided parallel to the switch 33 and is controlled by a timer 41 parallel to the first timer. However, this second timer is the type that will not close the normally open second auxiliary switch unless energized for several seconds. Therefore, it will operate only when the signal switch remains closed. The result is that whether the cam stops in a position where signal switch 28 is open or in a position where that switch is closed, one or the other of the auxiliary switches will operate and close the circuit through signal 35 and any additional circuit that may be connected across it.

A further feature of this invention is that the driving unit switches and other elements in housing 1 are all enclosed by a cover 45 that seals them from the atmosphere. For this purpose the outside of the housing is provided with a pair of axially spaced annular flanges. The flange 46 closest to the open end of the housing preferably has a diameter that is less than the other or lower flange 47. Between the two flanges the outside of the housing has a vertical surface that is connected by an upwardly tapered surface with the upper flange. If the housing is cylindrical, the cover either is cylindrical likewise or at least has a cylindrical portion that encircles the housing. The lower end of the cover preferably is flared out slightly and may engage the upper surface of the lower flange. Between the cover and the enclosed cylindrical surface of the housing, a resilient gasket 48 of rubber or the like is compressed to form a seal.

This gasket, when not compressed, is round in radial section so that it can be rolled along the surface of the housing. Therefore, when the cover is pulled off the housing it will roll the gasket up the tapered surface toward the upper flange so that the pressure of the gasket against the cover will be relieved. At the upper end of the tapered surface the gasket will still snugly engage the housing, as shown in dotted lines in Fig. 1, but the outer diameter of the gasket in that position will be only enough greater than the inside diameter of the cover to permit the latter to frictionally engage the gasket and roll it down on the housing when the cover is replaced and pushed down. The gasket not only seals the unit, but it holds the cover tightly in place. The easiest way to remove the cover is to tilt it so that one edge will rock on the lower flange while the opposite edge will rise. The clearance between the upper flange and the cover permits the tilting. The cover is then tilted in the opposite direction and then is pulled off the housing.

During these movements, the gasket is rolled up the tapered surface of the housing.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. In a bin level indicator, the combination with a motor-driven shaft and a separate paddle shaft mounted in axial end-to-end alignment, of an elongated helical torsion drive spring connected at its opposite ends to said shafts, a cam rigidly mounted on said paddle shaft, and a circuit-controlling switch having a movable controller beside said cam in a position to be actuated thereby, whereby to periodically energize said circuit as long as the paddle shaft continues to rotate.

2. In a bin level indicator as defined in claim 1, said circuit containing a signal to indicate that the paddle shaft is rotating.

3. In a bin level indicator as defined in claim 1, said circuit containing a normally open switch controlling another circuit, said last-mentioned switch being adapted to close if said cam stops while said first-mentioned switch is open.

4. In a bin level indicator as defined in claim 1, said circuit containing two normally open switches connected in parallel in another circuit, one of said last-mentioned switches being adapted to close if said cam stops while said first-mentioned switch is open, and the other of said last-mentioned switches being adapted to close if said cam stops while said first-mentioned switch is closed.

5. In a bin level indicator, the combination with a motor-driven shaft and a separate paddle shaft mounted in axial end-to-end alignment, of an elongated helical torsion drive spring connected at its opposite ends to said shafts, a normally closed motor-controlling switch having a movable controller beside said spring, said spring being formed to change its diameter when said driven shaft continues to rotate after the paddle shaft has stopped rotating, and said spring by such change in diameter being effective to move said switch controller to open the switch and stop said driven shaft, a cam rigidly mounted on said paddle shaft, and a circuit-controlling switch having a movable controller beside said cam in a position to be actuated thereby while said motor-controlling switch is closed, whereby to periodically energize said circuit as long as the paddle shaft continues to rotate, said circuit including said motor-controlling switch so that said circuit is broken while the motor-controlling switch is open.

6. In a bin level indicator, the combination with a motor-driven shaft and a separate paddle shaft mounted in axial end-to-end alignment, of an elongated helical torsion drive spring connected at its opposite ends to said shafts, a normally closed motor-control switch having a movable controller beside said spring, the convolutions of said spring being adapted to enlarge when said driven shaft continues to rotate after the paddle shaft has stopped rotating, a guide member rigidly mounted close to the largest convolution of the spring and having an inner surface substantially concentric with said shafts for engagement by a segment of said largest convolution when said spring enlargement takes place, the opposite side of said largest convolution being adapted to engage said switch controller to open the switch and stop said driven shaft, a cam rigidly mounted on said paddle shaft, and a circuit-controlling switch having a movable controller beside said cam in a position to be actuated thereby while said motor-controlling switch is closed, whereby to periodically energize said circuit as long as the paddle shaft continues to rotate.

7. A bin level indicator comprising a cylindrical housing open at one end and closed at its opposite end, said closed end having a central opening therethrough, a paddle shaft journaled in said opening, an electric driving unit secured to the housing and having a shaft coaxial with the paddle shaft, an elongated helical torsion drive spring connected at its opposite ends to said shaft, a normally closed motor-controlling switch in the housing having a movable controller beside said spring and adapted to be moved by the spring to open the switch as the diameter of the spring changes when rotation of the paddle shaft is stopped while the driving unit continues to operate, the outside of the housing being provided with a pair of axially spaced annular flanges, the outside of the housing between said flanges having a surface substantially parallel to the axis of the housing and also a surface tapered from said parallel surface toward said open end, a resilient gasket round in radial section tightly encircling said parallel surface, and a cover enclosing said driving unit and open end of the housing and having a portion substantially engaging the housing flange located farthest from said open end, the cover tightly compressing said gasket against the housing to form a seal, and the gasket being adapted to be rolled by the cover toward the smaller end of said tapered surface when the cover is pulled off the housing, whereby the pressure of the gasket against the cover will be relieved.

8. A bin level indicator as defined in claim 7, in which the gasket is a size to snugly engage said smaller end of the tapered surface and in that position has an outside diameter only slightly greater than the inside of the cover.

References Cited in the file of this patent

UNITED STATES PATENTS

| | | |
|---|---|---|
| 2,647,251 | Archibald | July 28, 1953 |
| 2,698,362 | Bozich | Dec. 28, 1954 |